(12) United States Patent
Yang (10) Patent No.: US 12,094,244 B2
(45) Date of Patent: Sep. 17, 2024

(54) METHOD FOR RECOGNIZING MASKED FACES, DEVICE FOR RECOGNIZING MASKED FACES, AND COMPUTER STORAGE MEDIUM

(71) Applicant: HONG FU JIN PRECISION INDUSTRY (WuHan) CO., LTD., Wuhan (CN)

(72) Inventor: Chin-Wei Yang, New Taipei (TW)

(73) Assignee: HONG FU JIN PRECISION INDUSTRY (WuHan) CO., LTD., Wuhan (CN)

( * ) Notice: Subject to any disclaimer, the term of this patent is extended or adjusted under 35 U.S.C. 154(b) by 371 days.

(21) Appl. No.: 17/555,649

(22) Filed: Dec. 20, 2021

(65) Prior Publication Data

US 2022/0327861 A1 Oct. 13, 2022

Related U.S. Application Data

(63) Continuation-in-part of application No. PCT/CN2021/086114, filed on Apr. 9, 2021.

(51) Int. Cl.
*G06K 9/62* (2022.01)
*G06V 10/22* (2022.01)
*G06V 10/82* (2022.01)
*G06V 40/16* (2022.01)

(52) U.S. Cl.
CPC ............ *G06V 40/172* (2022.01); *G06V 10/22* (2022.01); *G06V 10/82* (2022.01); *G06V 40/168* (2022.01)

(58) Field of Classification Search
CPC ......................................... G06V 40/16–40/179
See application file for complete search history.

(56) References Cited

U.S. PATENT DOCUMENTS

| | | | |
|---|---|---|---|
| 2009/0110248 A1* | 4/2009 | Masuda | G07C 9/37 382/118 |
| 2021/0374468 A1* | 12/2021 | Chandraker | G06N 3/084 |
| 2022/0044007 A1* | 2/2022 | Saleh | G06V 40/161 |

OTHER PUBLICATIONS

"OpenCV", WikipediA article, https://en.wikipedia.org/wiki/OpenCV, downloaded on Feb. 20, 2024, article pp. 1-4. (Year: 2024).*
Rohit Kundu, "YOLO Algorithm for Object Detection Explained", https://www.v7labs.com/blog/yolo-object-detection, Jan. 17, 2023, pp. 1-29. (Year: 2023).*

(Continued)

*Primary Examiner* — Brian Werner
(74) *Attorney, Agent, or Firm* — ScienBiziP, P.C.

(57) ABSTRACT

A method for recognizing masked faces includes: obtaining a face image to be recognized; detecting whether the face image to be recognized has a mask; extracting feature vectors of a whole face in the face image to be recognized when the face image to be recognized does not have a mask; comparing the feature vectors of the whole face with face images in a first database, and outputting a face recognition result; extracting feature vectors of an upper half face in the face image to be recognized when the face image to be recognized has a mask; comparing the feature vectors of the upper half face with face images in a second database, and outputting the face recognition result. The method of the present disclosure processes images of faces with and without masks, expanding application scenario of face recognition and improving the accuracy of recognition.

12 Claims, 5 Drawing Sheets

(56) References Cited

OTHER PUBLICATIONS

Kinnikar et al., "Face Recognition Using Gabor Filter And Convolutional Neural Network", ICIA'16, Aug. 25-26, 2016, Pondicherry, India, ACM 978-1-4503-4756-3/16/08 copyright 2016, 4 pages. (Year: 2016).*

* cited by examiner

METHOD FOR RECOGNIZING MASKED FACES, DEVICE FOR RECOGNIZING MASKED FACES, AND COMPUTER STORAGE MEDIUM

FIELD

The disclosure relates to image processing technology, in particular to a method for recognizing masked faces, a device for recognizing masked faces, and a computer storage medium.

BACKGROUND

With the rapid development of computer technology, face recognition technology has also been paid attention to and more and more widely used, such as monitoring system, attendance record, education examination, and other occasions that need to verify identity.

However, Coronavirus disease (Covid-19) has been raging in the world, resulting in serious economic, property, and life safety losses, and threats. As a simple, effective, and low-cost epidemic prevention measure, wearing masks to prevent infection and slow transmission of Covid-19 is expected to be adopted for a long time in the future. Various scenes require the face recognition technology to be upgraded. At present, the commonly used face recognition technology is to detect and extract feature points from face information of a wholly-visible face. When face recognition is needed, several feature points of a face are extracted and compared. However, when some faces are covered by masks, the number of human face feature points exposed decreases sharply, which significantly reduces the accuracy of face recognition.

SUMMARY

In view of this, the present disclosure provides a method of for recognizing masked faces to perform face recognition when people wear masks.

A method for recognizing masked faces, comprising: obtaining a face image to be recognized; detecting whether the face image to be recognized has a mask; extracting feature vectors of a whole face in the face image to be recognized when the face image to be recognized does not have a mask; comparing the feature vectors of the whole face with face images in a first database, and outputting a face recognition result; extracting feature vectors of an upper half of a face in the face image to be recognized when the face is masked; comparing the feature vectors of the upper half of the face with face images in a second database, and outputting a face recognition result.

In at least one embodiment, the method of for recognizing masked faces further comprises: amplifying the face images in the first database to obtain the second database.

In at least one embodiment, the step of amplifying the face images in the first database to obtain the second database comprises: reading each of the face images in the first database; performing face detection on each of the face images and locating face feature points of each of the face images; correcting a face detection range of each of the face images by using the face feature points; isolating an upper half of each of the face images according to the face detection range to obtain an upper half face image; storing the upper half face image to the second database.

In at least one embodiment, the step of amplifying the face images in the first database to obtain the second database comprises: reading each of the face images in the first database; performing face detection on each of the face images; calculating a compensation coefficient for deviations based on an unselected face part of each of the face images after the face detection; correcting a face detection range of each of the face images according to the compensation coefficient for deviations; isolating an upper half of each of the face images according to the face detection range to obtain an upper half face image; storing the upper half face image to the second database.

In at least one embodiment, the step of amplifying the face images in the first database to obtain the second database comprises: reading each of the face images in the first database; performing face detection on each of the face images and locating face feature points of each of the face images; calculating a compensation coefficient for deviations based on an unselected face part of each of the face images after the face detection; correcting a face detection range of each of the face images according to the compensation coefficient for deviations and the face feature points; isolating an upper half of each of the face images according to the face detection range to obtain an upper half face image; storing the upper half face image to the second database.

In at least one embodiment, the step of isolating an upper half of each of the face images to obtain an upper half face image comprises: isolating the upper half of each of the face images using the region of interest function of OpenCV to obtain the upper half of each of the face images.

In at least one embodiment, the step of detecting whether the face image to be recognized has a mask comprises: training a Yolo target detection model using a plurality of face sample photos wearing masks; and detecting whether the face image to be recognized has a mask using the trained Yolo target detection model.

In at least one embodiment, the step of comparing the feature vectors of the whole face with face images in a first database and the step of comparing the feature vectors of the upper half of the face with face images in a second database comprise: calling up the face images of the first database or the face images of the second database by using a preset convolution neural network to obtain feature vectors of a plurality of face samples; and comparing the feature vectors of the plurality of face samples with the feature vectors of the whole face or the feature vectors of the upper half of the face.

The present disclosure provides a device for recognizing masked faces, the device for recognizing masked faces includes a processor and a storage, the memory stores several computer-readable instructions, and the processor is configured to execute the computer-readable instructions stored in the storage to perform the steps of the method for recognizing masked faces.

The present disclosure provides a computer storage medium for storing computer readable instructions. When the instructions are executed, the steps of the above-mentioned method for recognizing masked faces are executed.

Compared with the related art, the method for recognizing masked faces, the device for recognizing masked faces, and the computer storage medium of the present disclosure perform face recognition of a person wearing a mask by constructing face image data with the person wearing the mask, which has beneficial effects of more scenarios and high use value.

BRIEF DESCRIPTION OF THE DRAWINGS

The above and/or additional aspects and advantages of the disclosure will become apparent and easy to understand from the description of the embodiments in combination with the following drawings, wherein.

LABELS OF COMPONENTS

| | |
|---|---|
| device for recognizing masked faces | 100 |
| processor | 1001 |
| storage | 1002 |
| communication bus | 1003 |
| camera | 1004 |
| computer program | 1005 |

The following exemplary embodiments in combination with the above drawings will further explain the present disclosure.

DETAILED DESCRIPTION

In order to better understand the above objects, features and advantages of the disclosure, the disclosure is described in combination with the drawings and exemplary embodiments. It should be noted that the embodiments of the present disclosure and the features in the embodiments can be combined with each other without conflict.

Many specific details are set forth in the following description to facilitate a full understanding of the disclosure. The described embodiments are only part of the embodiments of the disclosure, not all of them.

Unless otherwise defined, all technical and scientific terms used herein have the same meanings as those generally understood by those skilled in the art of the present disclosure. The terms used in the description of the disclosure herein are only for the purpose of describing exemplary embodiments, and are not intended to limit the disclosure.

Figure 1:
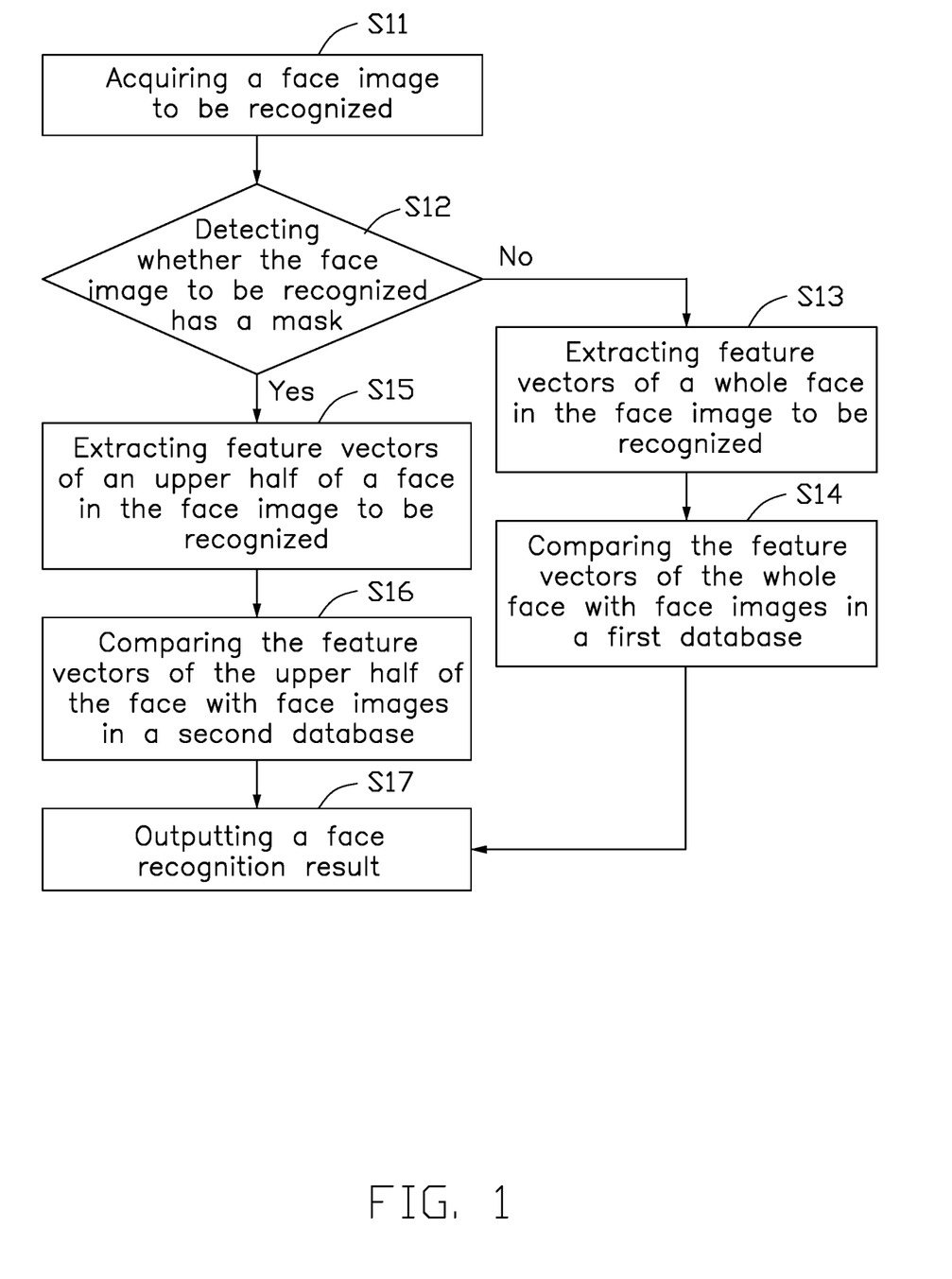
FIG. 1 is a flowchart of a method for recognizing masked faces in an embodiment of the present disclosure.

Referring to FIG. 1, a method for recognizing masked faces includes:
  S11: acquiring a face image to be recognized;
  S12: detecting whether the face image to be recognized has a mask;
  S13: when the face image to be recognized does not have a mask, extracting feature vectors of a whole face in the face image to be recognized;
  S14: comparing the feature vectors of the whole face with face images in a first database;
  S15: when the face image to be recognized has a mask, extracting feature vectors of an upper half of a face in the face image to be recognized;
  S16: comparing the feature vectors of the upper half of the face with face images in a second database
  S17: outputting a face recognition result.

In step S11, an image capture device such as a camera, can be used to obtain the face image to be recognized. For example, a Logitech webcam c920hd Pro webcam is used to obtain the face image to be recognized, such webcam has high performance, high resolution, and automatic light source correction.

In steps S12 to S16, the embodiment can use a computer and an external Rockchip rk1808 compute stick to perform the above steps, and the computer can install Ubuntu operating system, Python language, Opencv library, and rockchip related drivers. The compute stick is a special hardware accelerator for deep neural network with integrated computing core. The compute stick has the characteristics of low power consumption and high-performance visual computing (GPU acceleration), which can significantly improve the operation efficiency of face recognition algorithm. Drivers related to Rockchip can include RkNN toolkit, rockx SDK, etc.

Different from the conventional face recognition process, the step of mask-wearing recognition is added before face recognition. The situation of wearing a mask is distinguished and the steps S13, S14, S15, and S16 are executed. The more complex face recognition can be distinguished independently and the scope of scene is improved.

In one embodiment, the above steps S11 to S16 may also be performed by an electronic device integrated with a camera. The electronic device may be an access control device, a portable terminal, a computer, etc.

In one embodiment, the method for recognizing masked faces can also include: amplifying the face images in the first database to obtain the second database. The first database is an existing face database for processing face recognition without masks. The second database is a face database for processing face recognition with masks. Expanding a database on the basis of an original database also eliminates steps of repeatedly entering data.

Figure 2:
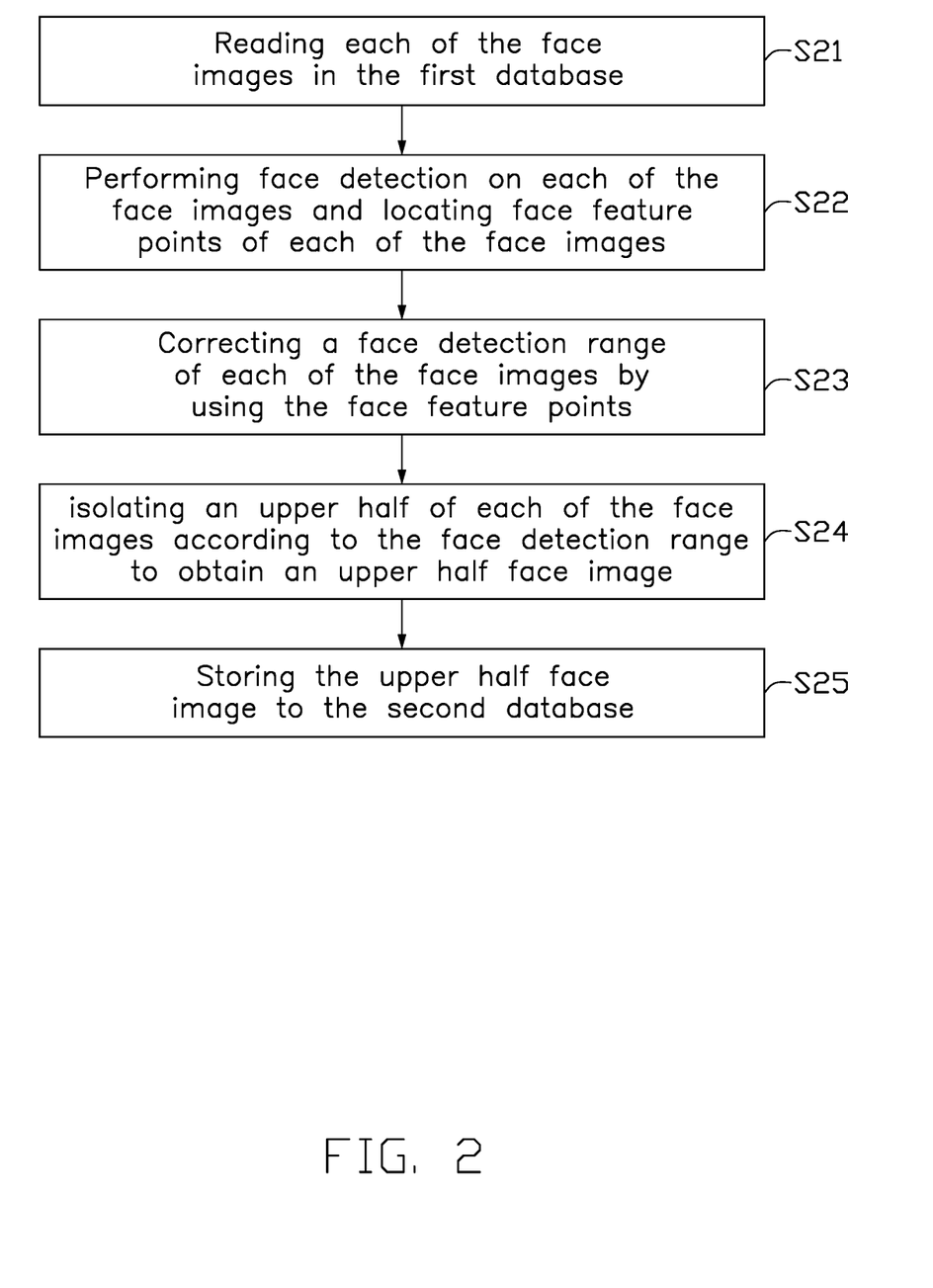
FIG. 2 is a flowchart of a first amplification process of a first database in the method for recognizing masked faces of FIG. 1.

Referring to FIG. 2, in one embodiment, the step of amplifying the face images in the first database to obtain the second database may include:
  S21: reading each of the face images in the first database;
  S22: performing face detection on each of the face images and locating face feature points of each of the face images;
  S23: correcting a face detection range of each of the face images by using the face feature points;
  S24: isolating an upper half of each of the face images according to the face detection range to obtain an upper half face image;
  S25: storing the upper half face image to the second database.

The face feature points detected in step S22 are usually 68 or 81 feature points. In the face feature points detection in step S22, a total of five face feature points can be selected from two points of the left eye corner, two points of the right eye corner, and the middle point of the bridge of the nose. When viewed from the front, the five face feature points usually form a straight line. However, an actual acquired face image may not just a front face, and there is often a skew angle. Thus, the connecting line of the five face feature points may not be straight. Therefore, step S23 will correct the angle of the face image according to the five face feature points to obtain the correction of the front image of the face image. The image obtained by this correction method has higher accuracy when used for comparison.

Figure 3:
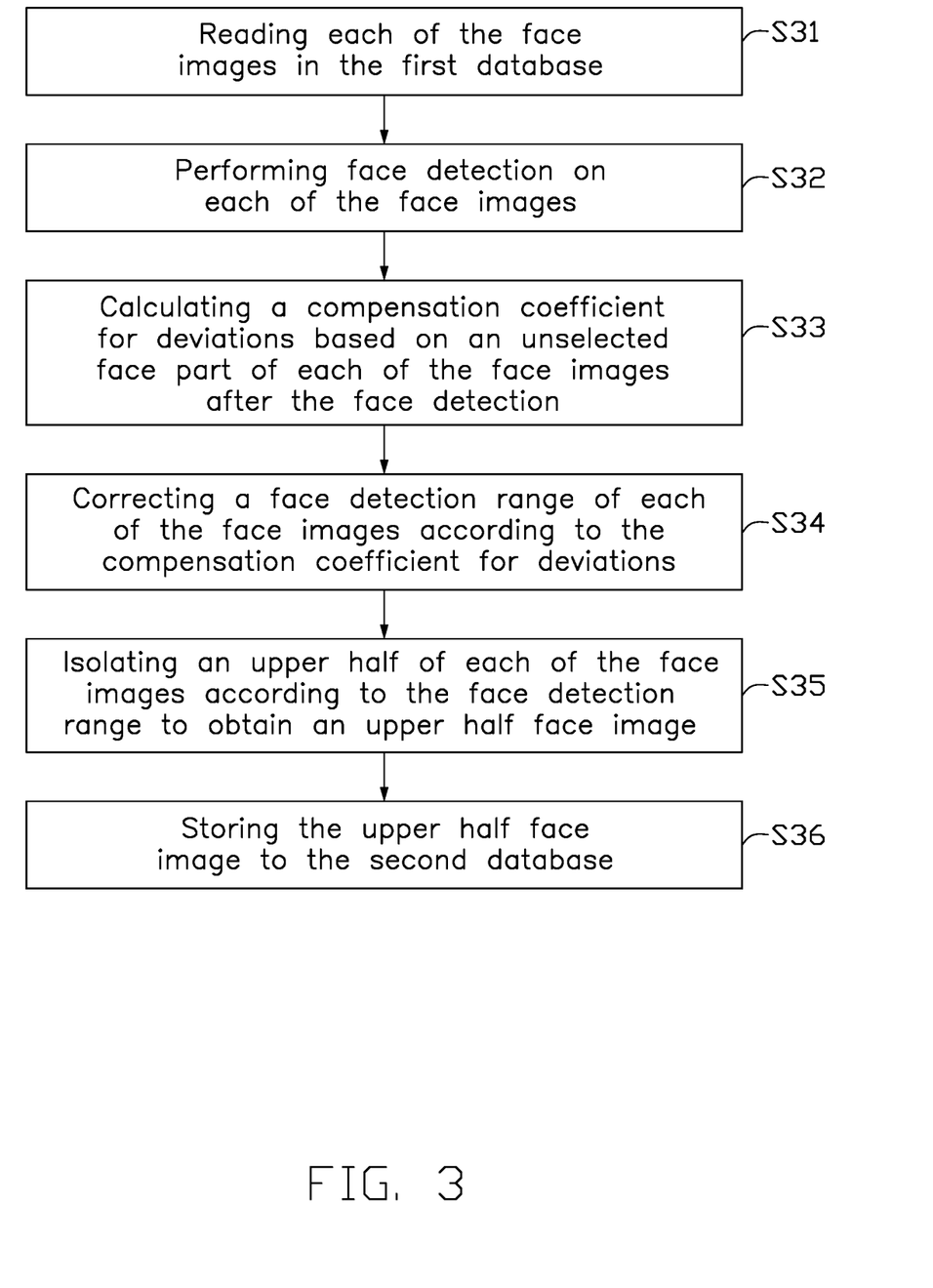
FIG. 3 is a flowchart of a second amplification process in the method for recognizing masked faces.

Referring to FIG. 3, in one embodiment, the step of amplifying the face images in the first database to obtain the second database may include:
  S31: reading each of the face images in the first database;
  S32: performing face detection on each of the face images;

S33: calculating a compensation coefficient for deviations based on an unselected face part of each of the face images after the face detection;

S34: correcting a face detection range of each of the face images according to the compensation coefficient for deviations;

S35: isolating an upper half of each of the face images according to the face detection range to obtain an upper half face image;

S36: storing the upper half face image to the second database.

In step S32, it is easy to miss hair, ears, and other parts when the face image is selected by face detection. Therefore, the compensation coefficient for deviations can be calculated based on the face detection results, and the range of face selection can be expanded based on the face detection results according to the compensation coefficient for deviations, so as to obtain a more complete face image, which is convenient for the comparison of the intercepted upper half of the face images.

Figure 4:
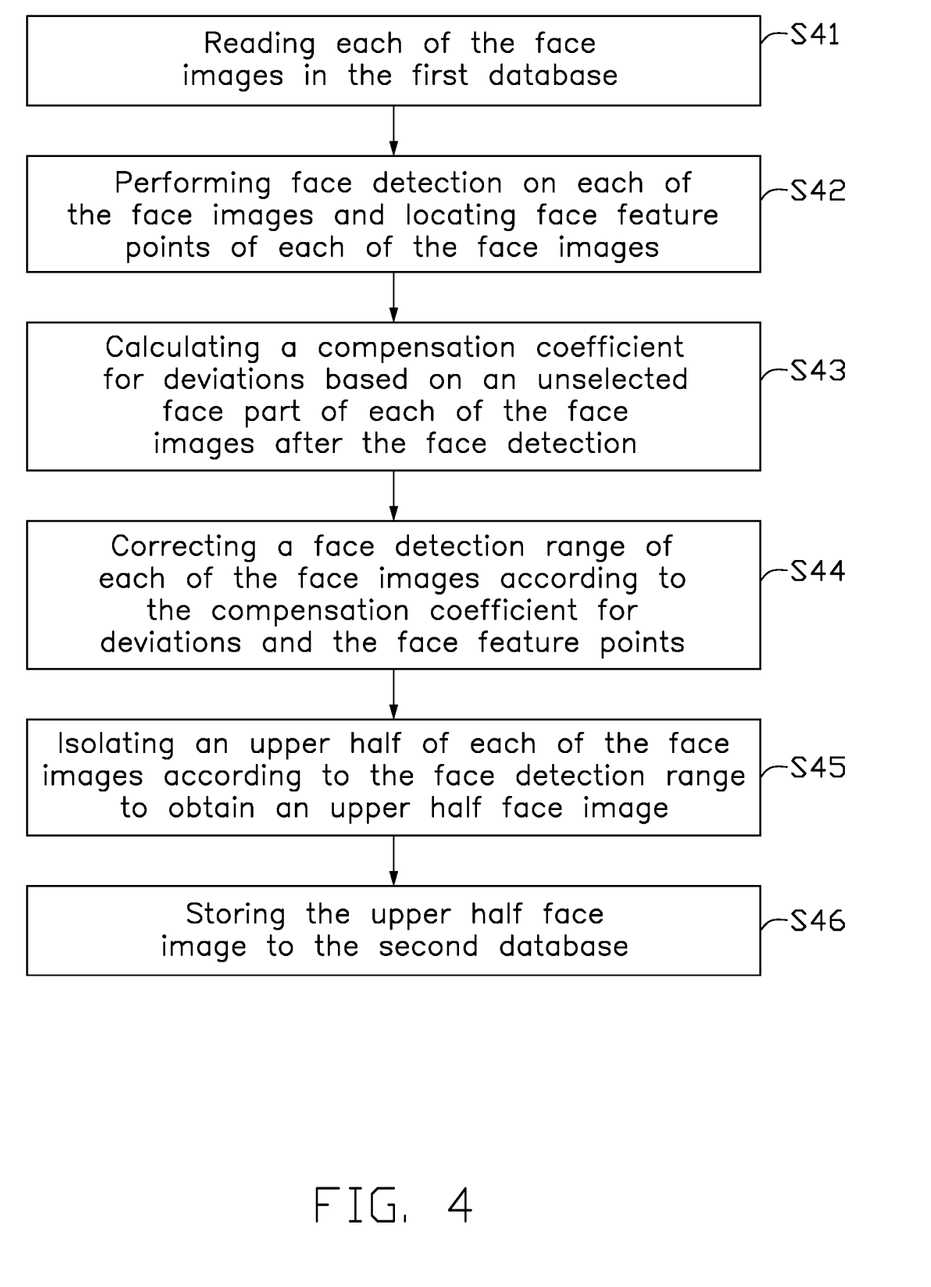
FIG. 4 is a flowchart of a third amplification process of the first database in the method for recognizing masked faces.

Referring to FIG. 4, in one embodiment, the step of amplifying the face images in the first database to obtain the second database may include:

S41: reading each of the face images in the first database;

S42: performing face detection on each of the face images and locating face feature points of each of the face images;

S43: calculating a compensation coefficient for deviations based on an unselected face part of each of the face images after the face detection;

S44: correcting a face detection range of each of the face images according to the compensation coefficient for deviations and the face feature points;

S45: isolating an upper half of each of the face images according to the face detection range to obtain an upper half face image;

S46: storing the upper half face image to the second database.

In step S42, the face feature points of the detected face image are usually 68 or 81 face feature points. The face feature point can select a point between a top point of the nose bridge and a point on the middle of the lower lip, that is, the point is about the tip of a nose, which is also the position where the upper edge of a mask is usually found. The compensation coefficient for deviations is calculated based on the results of face detection, and based on the middle point of the face feature points, the range of face selection is expanded, so as to obtain a more complete face image, which is convenient for the comparison of the intercepted upper half face image.

In one embodiment, the step of isolating an upper half of each of the face images to obtain an upper half face image includes: isolating the upper half of each of the face images using the region of interest function of Intel's OpenCV to obtain the upper half of each of the face image. The region of interest (ROI) function is used to select a specific region. The region of interest (ROI) function is usually used to select the key parts of image analysis, which is convenient for subsequent targeted processing. The region of interest (ROI) function has the advantages of reducing processing time and increasing accuracy.

In one embodiment, the step of detecting whether the face image to be recognized has a mask may include: training a Yolo target detection model using a plurality of face sample photos wearing masks, and using the trained Yolo target detection model to detect whether the face image to be recognized has a mask. In this embodiment, the face sample photos wearing masks are retrieved through the network, the face sample photos are divided into a training set and a test set according to the 80%/20% rule, and then mask parts of the face sample photos in the training set are frame-marked by labeling tool such as Labelimg. Then the operating environment and related settings of Yolo, such as the installation of keras and the weight file setting of Yolo, are configured. At this time, the training set is used to train the Yolo target detection model. The trained Yolo target detection model can be used to identify and frame mask parts in photos of people who wear masks. The test set is used to test the trained Yolo target detection model to obtain accurate face recognition of the trained Yolo target detection model. The trained Yolo target detection model can be used in step S12 to identify whether a person is wearing a mask.

In one embodiment, the step of comparing the feature vectors with the face images in the first database or the face images in the second database includes: calling up the face images of the first database or the face images of the second database by using a preset convolution neural network to obtain feature vectors of a plurality of face samples; and comparing the feature vectors of the plurality of face samples with the feature vectors of the whole face or the feature vectors of the upper half of the face. In the embodiment, the preset convolutional neural network is used to process the face image to obtain S12 dimensional face feature vectors. The S12 dimensional face feature vectors of the face image to be recognized are distance matched with S12 dimensional face feature vectors of the face images in the first database or second database to obtain similarity between the two. The similarity is compared with a preset threshold, when the similarity is less than the preset threshold, it is determined that the two images are of the same face.

In the setting of the preset threshold, the maximum value of the preset threshold can be 4 and the minimum value of the preset threshold can be 0. The preset threshold with the highest accuracy can be found by continuously testing at a unit distance of 0.01 in intervals 0~4. In the embodiment, when comparing a complete face image with the first database, when the preset threshold is 1.47, the accuracy is the highest, which is 99.50%; when comparing the upper half of a face with the second database, when the preset threshold is 1.42, the accuracy is the highest, 97.23%.

Figure 5:
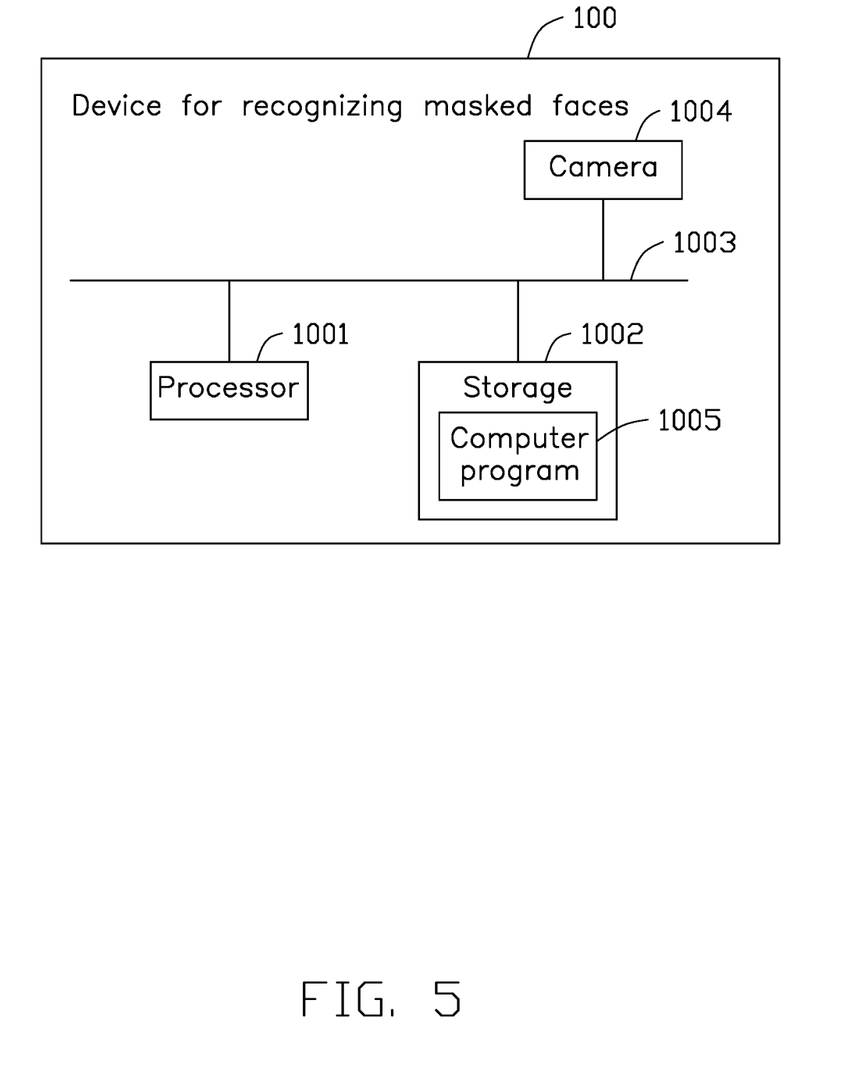
FIG. 5 is a schematic diagram of a device for recognizing masked faces in an embodiment of the present disclosure.

Referring to FIG. 5, a hardware structure diagram of a device for recognizing masked faces 100 is provided in the embodiment of the present disclosure. As shown in FIG. 5, the device for recognizing masked faces 100 may include a processor 1001, a storage 1002, a communication bus 1003, and a camera 1004. The camera 1004 may be a CMOS or CCD camera. The storage 1002 is used to store one or more computer programs 1005. The one or more computer programs 1005 are configured to be executed by the processor 1001. The one or more computer programs 1005 may include instructions that may be used to implement the method for recognizing masked faces in the device for recognizing masked faces 100.

It can be understood that the structure illustrated in the present embodiment does not limit the device for recognizing masked faces 100. In other embodiments, the device for recognizing masked faces 100 may include more or fewer components than shown, or combine some components, or split some components, or have different component arrangements.

The processor 1001 may include one or more processing units. For example, the processor 1001 may include a disclosure processor (AP), a graphics processing unit (GPU), an image signal processor (ISP), a controller, a video codec, a DSP, a CPU, a baseband processor, and/or a neural network processor (neural network processing unit, NPU), etc. Different processing units can be independent devices or integrated in one or more processors.

The processor 1001 may also be provided with a memory for storing instructions and data. In some embodiments, the memory in the processor 1001 is a cache memory. The memory can store instructions or data created or used or recycled by the processor 1001. If the processor 1001 needs to use the instructions or data again, it can be called up directly from the memory, which avoids repeated access, the waiting time of the processor 1001 is reduced, thereby improving the efficiency of the system.

In some embodiments, the processor 1001 may include one or more interfaces. The interface may include an integrated circuit (I2C) interface, an integrated circuit sound (I2S) interface, a pulse code modulation (PCM) interface, a universal asynchronous receiver/transmitter (UART) interface, and a mobile industry processor interface (MIPI), general purpose input/output (GPIO) interface, SIM interface, and/or USB interface, etc.

In some embodiments, the storage 1002 may include random access memory, and may also include nonvolatile memory, such as hard disk, memory, plug-in hard disk, smart media card (SMC), secure digital (SD) card, and flash card, at least one disk storage device, flash memory device, or other volatile solid-state storage device.

The embodiment also provides a computer storage medium. The computer storage medium stores computer instructions. When the computer instructions run on an electronic device, the electronic device performs the above embodiment of steps of perform the method for recognizing masked faces in the embodiment.

All or part of the steps in the method of the above embodiments in the disclosure also can be completed through a computer program for instructing relevant hardware. The computer program can be stored in a computer-readable storage medium. When the computer program is executed by a processor, it can perform the steps of the above method. The computer program includes computer program code, which can be in the form of source code, object code, executable file or some intermediate forms, etc. The computer-readable medium may include any entity or device capable of carrying the computer program code, recording medium, U disk, mobile hard disk, magnetic disk, optical disk, computer memory, read only memory (ROM), random access memory (RAM), electric carrier signal, telecommunication signal, software distribution medium, etc. It should be noted that the content contained in the computer-readable medium can be increased or decreased according to the requirements of legislation and patent practice in jurisdictions. For example, in some jurisdictions, according to legislation and patent practice, a computer-readable medium does not include electric carrier signals and telecommunication signals.

In the several embodiments provided by the present disclosure, it should be understood that the disclosed computer devices and methods can be implemented in other ways. For example, the embodiment of the computer device described above is only schematic. For example, the division of the unit is only a logical function division, and there may be other division modes in actual implementation.

In addition, each functional unit in each embodiment of the disclosure can be integrated in the same processing unit, each unit can exist separately, or two or more units can be integrated in the same unit. The above integrated units can be performed in the form of hardware or hardware plus software function modules.

It will be obvious to those skilled in the art that the disclosure is not limited to the details of the above exemplary embodiments, and the disclosure can be performed in other specific forms without departing from the spirit or basic features of the disclosure. Therefore, from any point of view, the embodiments should be regarded as exemplary and non limiting. In addition, it is clear that the word "including" does not exclude other units or steps, and the singular does not exclude the plural. The multiple units or computer devices stated in claims of the computer device may also be implemented by the same unit or computer device through software or hardware. Words such as "first", "second" are used for naming, not any specific order.

Finally, it should be noted that the above embodiments are only used to illustrate the technical scheme of the disclosure rather than limitation. Although the disclosure has been described in detail with reference to the preferred embodiment, those skilled in the art should understand that the technical scheme of the disclosure can be modified or replaced with equivalent embodiments without departing from the spirit and scope of the technical scheme of the disclosure.

What is claimed is:

1. A method for recognizing masked faces, comprising:
    obtaining a face image to be recognized;
    detecting whether the face image to be recognized has a mask;
    extracting feature vectors of a whole face in the face image to be recognized when the face image to be recognized does not have a mask;
    comparing the feature vectors of the whole face with face images in a first database, and outputting a face recognition result;
    extracting feature vectors of an upper half face in the face image to be recognized when the face image to be recognized has a mask;
    comparing the feature vectors of the upper half face with face images in a second database, and outputting the face recognition result, wherein the second database is obtained by amplifying the face images in the first database, a step of amplifying the face images in the first database to obtain the second database comprises:
    reading each of the face images in the first database;
    performing face detection on each of the face images;
    calculating a compensation coefficient for deviations based on an unselected face part of each of the face images after the face detection;
    correcting a face detection range of each of the face images according to the compensation coefficient for deviations;
    isolating an upper half of each of the face images according to the face detection range to obtain an upper half face image;
    storing the upper half face image to the second database.

2. The method for recognizing masked faces of claim 1, wherein isolating an upper half of each of the face images to obtain an upper half face image comprises:
    isolating the upper half of each of the face images using a region of interest function of OpenCV to obtain the upper half face image.

3. The method for recognizing masked faces of claim 1, wherein detecting whether the face image to be recognized has a mask comprises:

training a Yolo target detection model using a plurality of face sample photos with masked faces; and detecting whether the face image to be recognized has a mask using the trained Yolo target detection model.

4. The method for recognizing masked faces of claim 1, wherein comparing the feature vectors of the whole face with face images in a first database or comparing the feature vectors of the upper half face with face images in a second database comprises:

calling the face images of the first database or the face images of the second database by using a preset convolution neural network to obtain feature vectors of a plurality of face samples; and comparing the feature vectors of the plurality of face samples with the feature vectors of the whole face or the feature vectors of the upper half face.

5. A device for recognizing masked faces comprising a processor and a storage storing a plurality of computer-readable instructions, wherein the processor is configured to execute the plurality of computer-readable instructions stored in the storage to:

obtain a face image to be recognized;

detect whether the face image to be recognized has a mask;

extract feature vectors of a whole face in the face image to be recognized when the face image to be recognized does not have a mask;

compare the feature vectors of the whole face with face images in a first database, and outputting a face recognition result;

extract feature vectors of an upper half face in the face image to be recognized when the face image to be recognized has a mask;

compare the feature vectors of the upper half face with face images in a second database, and outputting the face recognition result, wherein the processor is further configured to amplify the face images in the first database to obtain the second database, and amplifying the face images in the first database to obtain the second database comprises:

read each of the face images in the first database;

perform face detection on each of the face images;

calculate a compensation coefficient for deviations based on an unselected face part of each of the face images after the face detection;

correct a face detection range of each of the face images according to the compensation coefficient for deviations;

isolate an upper half of each of the face images according to the face detection range to obtain an upper half face image;

store the upper half face image to the second database.

6. The device for recognizing masked faces of claim 5, wherein isolate an upper half of each of the face images to obtain an upper half face image comprises:

isolate the upper half of each of the face images using a region of interest function of OpenCV to obtain the upper half face image.

7. The device for recognizing masked faces of claim 5, wherein detect whether the face image to be recognized has a mask comprises:

train a Yolo target detection model using a plurality of face sample photos with masked faces; and detect whether the face image to be recognized has a mask using the trained Yolo target detection model.

8. The device for recognizing masked faces of claim 5, wherein compare the feature vectors of the whole face with face images in a first database or compare the feature vectors of the upper half face with face images in a second database comprises:

call the face images of the first database or the face images of the second database by using a preset convolution neural network to obtain feature vectors of a plurality of face samples; and compare the feature vectors of the plurality of face samples with the feature vectors of the whole face or the feature vectors of the upper half face.

9. A device for recognizing masked faces comprising a processor and a storage storing a plurality of computer-readable instructions, wherein the processor is configured to execute the plurality of computer-readable instructions stored in the storage to:

obtain a face image to be recognized;

detect whether the face image to be recognized has a mask;

extract feature vectors of a whole face in the face image to be recognized when the face image to be recognized does not have a mask;

compare the feature vectors of the whole face with face images in a first database, and outputting a face recognition result;

extract feature vectors of an upper half face in the face image to be recognized when the face image to be recognized has a mask;

compare the feature vectors of the upper half face with face images in a second database, and outputting the face recognition result, wherein the processor is further configured to amplify the face images in the first database to obtain the second database, and amplifying the face images in the first database to obtain the second database comprises:

read each of the face images in the first database;

perform face detection on each of the face images and locating face feature points of each of the face images;

calculate a compensation coefficient for deviations based on an unselected face part of each of the face images after the face detection;

correct a face detection range of each of the face images according to the compensation coefficient for deviations and the face feature points;

isolate an upper half of each of the face images according to the face detection range to obtain an upper half face image;

store the upper half face image to the second database.

10. The device for recognizing masked faces of claim 9, wherein isolate an upper half of each of the face images to obtain an upper half face image comprises:

isolate the upper half of each of the face images using a region of interest function of OpenCV to obtain the upper half face image.

11. The device for recognizing masked faces of claim 9, wherein detect whether the face image to be recognized has a mask comprises:

train a Yolo target detection model using a plurality of face sample photos with masked faces; and detect whether the face image to be recognized has a mask using the trained Yolo target detection model.

12. The device for recognizing masked faces of claim 9, wherein compare the feature vectors of the whole face with face images in a first database or compare the feature vectors of the upper half face with face images in a second database comprises:

call the face images of the first database or the face images of the second database by using a preset convolution neural network to obtain feature vectors of a plurality of face samples; and compare the feature vectors of the plurality of face samples with the feature vectors of the whole face or the feature vectors of the upper half face.

\* \* \* \* \*